United States Patent [19]

Fozzard

[11] 3,887,629
[45] June 3, 1975

[54] PURIFICATION OF FLUOROCARBONS

[75] Inventor: George B. Fozzard, Bartlesville, Okla.

[73] Assignee: Phillips Petroleum Company, Bartlesville, Okla.

[22] Filed: Oct. 1, 1973

[21] Appl. No.: 402,407

[52] U.S. Cl. .................................................. 260/653
[51] Int. Cl. ............................................. C07c 17/38
[58] Field of Search .................................... 260/653

[56] References Cited
UNITED STATES PATENTS

| | | | |
|---|---|---|---|
| 2,473,911 | 6/1949 | Sarsfield | 260/653 |
| 2,508,221 | 5/1950 | Calfee et al. | 260/653 |
| 3,101,304 | 8/1963 | Wiist | 260/653 |

Primary Examiner—D. Horwitz
Attorney, Agent, or Firm—Neuman, Williams, Anderson & Olson

[57] ABSTRACT

A mixture of a fluorocarbon and a corresponding hydrocarbon is subjected to liquid-liquid solvent extraction. The extraction removes substantially all of the hydrocarbon and the fluorocarbon raffinate containing a small amount of hydrocarbon, such as on the order of 2 weight percent or less, is then distilled to obtain the fluorocarbon of at least about 99 weight percent purity.

6 Claims, No Drawings

PURIFICATION OF FLUOROCARBONS

This invention relates to the production of very pure fluorocarbons. The terms "fluorocarbon" and "hydrocarbon" as used herein refer, respectively, to perfluorinated alkanes and the corresponding alkanes.

It is known that fluorocarbons can be produced by the electrochemical fluorination of the corresponding hydrocarbons. Thus, for example, perfluoropropane ($C_3F_8$) can be produced by electrochemical fluorination of propane. Perfluoropropane finds use, among others, as a gaseous dielectric. For this use very high purity is required since even small amounts of hydrogen-containing contaminants adversely affect the stability and breakdown voltage. The electrochemical fluorination of propane provides a complex mixture containing propane (boiling point −44° C.), perfluoropropane (boiling point −39° C.) and various fluorinated intermediates. While propane and perfluoropropane, upon distillation, form a 1:1 molar azeotrope which boils at −48.5° C., neither propane nor perfluoropropane form azeotropes with any of the intermediates of the process. As a consequence, a pure binary mixture of propane and perfluoropropane can be distilled from the complex product mixture.

In accordance with the present invention a mixture of a fluorocarbon and a hydrocarbon is subjected to liquid-liquid solvent extraction with toluene or xylene. The extraction removes substantially all of the hydrocarbon and the fluorocarbon raffinate containing a small amount of hydrocarbon, such as on the order of 2 weight percent or less, is then distilled to obtain the fluorocarbon of at least about 99 weight percent purity. The present process is applicable to compounds containing 3 to 10 carbon atoms.

The following steps are involved in the process of the present invention:

a. solvent extraction of a fluorocarbon/hydrocarbon mixture gives an extract phase comprising solvent-/hydrocarbon and a raffinate phase comprising fluorocarbon containing minor amounts of solvent and hydrocarbon.

b. on fractionation the raffinate yields the following fractions:
  i. minor amount of minimum boiling fluorocarbon/hydrocarbon azeotrope (suitable for recycle to extraction step);
  ii. high purity fluorocarbon (major fraction); and
  iii. minor amount of solvent (suitable for recycle to extraction step).

c. on fractionation the extract phase yields the following fractions:
  i. hydrocarbon (for recovery if desired); and
  ii. solvent (suitable for recycle to extraction step).

The present invention finds particular utility for separating an azeotropic mixture of propane and perfluoropropane such as results from distillation of the product mixture obtained by electrochemical fluorination of propane. However, the invention can be advantageously practiced to separate mixtures of propane and perfluoropropane, irrespective of the manner in which the mixture is produced.

The extraction of a mixture of hydrocarbon and fluorocarbon is carried out at a low temperature, that is, a temperature below about +20° C. and preferably at a temperature of about −80° to −20° C. However, the temperature must be maintained sufficiently high to keep the mixture in the extraction zone completely in the liquid phase. The solvent, toluene or xylene, is employed in an amount of from about 0.5 to 10 parts by weight per part of the mixture to be extracted. The extraction can be carried out in conventional manner using conventional equipment. Separation of the extract phase and the raffinate phase readily occurs, which permits easy separation of the two. After extraction, the raffinate is then distilled to remove overhead a hydrocarbonfluorocarbon azeotrope followed by a very pure fraction of fluorocarbon.

The following specific examples further illustrate the invention.

EXAMPLE I

A mixture of n-butane, perfluoro-n-butane, and isomeric nonafluoro-n-butanes was fractionated at atmospheric pressure to give the azeotrope of n-butane and perfluoro-n-butane which boiled at −13° to −14° C. at atmospheric pressure and contained about 49 mole percent (19 weight percent) n-butane and about 51 mole percent (81 weight percent) perfluoro-n-butane.

A 114 pound sample of toluene was placed in a cylinder and chilled in a dry ice bath. A 75.75 pound sample of the n-butane/perfluoro-n-butane azeotrope was then added to the cylinder containing the cold toluene. The cylinder was capped and maintained overnight in the dry ice bath. The cylinder was removed from the cold bath, agitated and then inverted on a set of scales. A 60.25 pound sample of the perfluoro-n-butane rich raffinate was withdrawn into a cooled evacuated cylinder.

Fractionation of the above 60.25 pound sample of raffinate gave 31.75 pounds of distillate at −2.0° to −2.2° C. which, by gas-liquid chromatography analysis, showed the following composition:

| Components | Wt. % |
|---|---|
| Perfluoro-n-butane | 99.39 |
| Nonafluoro-n-butanes | 0.31 |
| Heavies | 0.30 |
| n-Butane | Trace |
| Water | Trace |

The original mixture used in this example had been water washed and dried prior to distilling out the n-butane/perfluoro-n-butane azeotrope.

EXAMPLE II

A mixture of perfluoroisobutane, isobutane, partially fluorinated isobutanes and hydrofluoric acid was pressurized into a cylinder chilled in a dry ice bath. The cylinder was removed from the bath, allowed to warm to room temperature and steam condensate was pressured into the cylinder (usually 4 or 5 pounds of water for 14 to 18 pounds of organic mixture) to wash out the hydrofluoric acid. The contents of the cylinder was thoroughly mixed and the very volatile organic phase was withdrawn from the vapor space in the top of the cylinder through an anhydrous calcium sulfate bed to an evacuated weighed receiving cylinder chilled in a dry ice bath. The volume of liquid in the receiving cylinder resulting from combining several experimental samples was estimated to be between 9 and 11 gallons and weighed about 94.25 pounds.

The above 94.25 pound sample was contacted with 85 pounds of toluene in a cylinder maintained in a dry ice bath. After allowing the mixture to stand for about 30 minutes in the dry ice bath, the cylinder was removed from the bath, agitated, and 72.75 pounds of the lower phase (raffinate) rich in perfluoroisobutane was transferred to another evacuated cylinder. The upper phase of toluene and isobutane if desired can be flash distilled to recover isobutane and toluene for any desired use.

A 32.25 pound sample of the above 72.75 pound raffinate was fractionated to give 6.25 pounds of isobutane/perfluoroisobutane azeotrope and 23.50 pounds of perfluoroisobutane. An additional 32 pounds of the 72.75 pound raffinate was fractionated to give 5.75 pounds of isobutane/perfluoroisobutane azeotrope and 22.25 pounds of perfluoroisobutane. Kettle bottoms and material losses in these two fractionations, respectively, amounted to 2.5 and 4.0 pounds.

Approximately 10 pounds of the above isobutane/perfluoroisobutane azeotrope were mixed with 21.25 pounds of azeotrope from a separate fractionation to give 31.25 pounds of azeotrope for extraction with 50 pounds of toluene. A 19.75 pound sample of perfluoroisobutane enriched raffinate was separated. A 7.75 pound portion of the raffinate remaining from the above 72.75 pound batch was combined with the above 19.75 pounds of raffinate to give 27.50 pounds of raffinate for fractionation. Fractionation gave 5.5 pounds of isobutane/perfluoroisobutane azeotrope and 12.75 pounds of perfluoroisobutane.

According to gas-liquid chromatography analysis, the isobutane/perfluoroisobutane azeotrope was about 66.9 mole percent (33.0 weight percent) isobutane and 33.1 mole percent (67 weight percent) perfluoroisobutane (approximate boiling point −18° to −19° C. at atmospheric pressure). The perfluoroisobutane fractions were combined to give 58.5 pounds of product. A gas-liquid chromatography analysis of this product showed it to contain 99.57 area percent perfluoroisobutane. The perfluoroisobutane distillate was collected at a head temperature of about −0.3° to −0.8° C. at atmospheric pressure.

EXAMPLE III

Propane/perfluoropropane azeotrope was charged to a cylinder containing toluene which had been cooled in a dry ice-Freon 11 mixture. The mixture was gently agitated and then maintained in the bath several minutes as the phases separated. The cylinder was removed from the bath and inverted to allow the lower phase (raffinate) rich in perfluoropropane to be transferred to another cylinder for storage prior to fractionation. The results of a typical extraction are shown in Table I.

TABLE I

Extraction of Propane/Perfluoropropane Azeotrope With Toluene at −70° C.

| Extraction | Toluene lbs. | Propane/ Perfluoropropane Azeotrope lbs. | Lower Phase (Raffinate) lbs. | Raffinate Phase Gas-Liquid Chromatography Analysis, Wt. % | |
| --- | --- | --- | --- | --- | --- |
| | | | | $C_3F_8$ | $C_3H_8$ |
| 1 | 68.4 | 28.1 | 20.0 | 99 | 1 |

A 19.2 pound sample of the above raffinate from a toluene extraction was charged to a 12 liter kettle and distilled through a 2 inch i.d., 15 tray Oldershaw column. Table II gives the results of this distillation.

TABLE II

Distillation of the Perfluoropropane Raffinate From a Toluene Extraction

| Cut | Head Temp., °C. | Reflux Ratio | Wt. Fraction lbs. | Gas-Liquid Chromatography Analysis, Wt. % | | |
| --- | --- | --- | --- | --- | --- | --- |
| | | | | $C_3F_8$ | $C_3H_8$ | Other |
| 1 | −49.0/−37.8 | 3:1/1:1 | 2.35 | 82.4 | 17.4 | 0.3 |
| 2 | −36.8/−36.2 | 1:1 | 7.55 | 99.9 | Trace | Not Detectable |
| 3 | −36.2/−36.0 | 1:1 | 4.00 | 99.9 | Trace | Not Detectable |

These modifications and equivalents which fall within the spirit of the invention are to be considered a part thereof.

What is claimed is:

1. A process for obtaining a high purity perfluoroalkane containing from 3 to 10 carbon atoms from a mixture thereof with a corresponding alkane which comprises extracting the mixture in a liquid phase at a temperature below about +20° C with toluene or xylene and subjecting the resulting raffinate to distillation and recovering from said distillation a perfluoroalkane of high purity.

2. A process in accordance with claim 1 wherein the perfluoroalkane is perfluoro-n-butane and the alkane is normal butane.

3. A process in accordance with claim 1 wherein the perfluoroalkane is perfluoroisobutane and the alkane is isobutane.

4. A process in accordance with claim 1 wherein the extraction is carried out at a temperature of from about −80° to −20° C.

5. A process in accordance with claim 1 wherein the perfluoroalkane is perfluoropropane and the alkane is propane.

6. The process of claim 5 wherein the mixture of perfluoropropane and propane is an azeotropic mixture resulting from distillation.

* * * * *